US010001291B2

(12) United States Patent
Perry et al.

(10) Patent No.: US 10,001,291 B2
(45) Date of Patent: Jun. 19, 2018

(54) TWO MODE THERMOSTAT WITH SET-BACK TEMPERATURE AND HUMIDITY SET-POINT FEATURE

(71) Applicant: Emerson Electric Co., St. Louis, MO (US)

(72) Inventors: David L. Perry, St. Louis, MO (US); John M. Sartain, Chesterfield, MO (US)

(73) Assignee: Emerson Electric Co., St. Louis, MO (US)

( * ) Notice: Subject to any disclaimer, the term of this patent is extended or adjusted under 35 U.S.C. 154(b) by 384 days.

(21) Appl. No.: 14/518,309

(22) Filed: Oct. 20, 2014

(65) Prior Publication Data

US 2015/0039137 A1 Feb. 5, 2015

Related U.S. Application Data

(62) Division of application No. 12/870,355, filed on Aug. 27, 2010, now Pat. No. 8,863,536, which is a division
(Continued)

(51) Int. Cl.
*F24F 11/00* (2018.01)
*G05D 22/02* (2006.01)
(Continued)

(52) U.S. Cl.
CPC ............ *F24F 11/001* (2013.01); *F24F 11/30* (2018.01); *G05B 15/02* (2013.01); *G05D 22/02* (2013.01);
(Continued)

(58) Field of Classification Search
CPC .. F24F 11/0012; F24F 11/0015; F24F 211/10; F24F 211/20; F24F 11/48; F24F 11/65
(Continued)

(56) References Cited

U.S. PATENT DOCUMENTS 4,266,599 A 5/1981 Saunders et al.
4,271,898 A 6/1981 Freeman
(Continued)

FOREIGN PATENT DOCUMENTS

EP 1443280 A1 * 8/2004 ............. F24F 3/153

*Primary Examiner* — Frantz Jules
*Assistant Examiner* — Nelson Nieves
(74) *Attorney, Agent, or Firm* — Harness, Dickey & Pierce, P.L.C.

(57) ABSTRACT

Various thermostat embodiment are provided that includes at least a first sensor configured to communicate information indicative of the temperature within the space, and at least a second sensor configured to communicate information indicative of the humidity within the space. The thermostat further includes a controller in communication with the at least first and second sensors, for controlling the thermostat's operation. The controller is configured to operate in a first mode in which the controller operates the air conditioner when the sensed temperature of the space is above a temperature set-point or when the sensed humidity level is above the humidity set-point. The controller is further configured to operate in a second mode in which the controller operates the air conditioner when the sensed temperature is below a set-back temperature set-point, or when the sensed humidity is above a set-back humidity set-point.

8 Claims, 7 Drawing Sheets

Related U.S. Application Data of application No. 11/796,923, filed on Apr. 30, 2007, now Pat. No. 7,793,510.

(51) Int. Cl.
  *G05D 23/19* (2006.01)
  *G05D 27/02* (2006.01)
  *G05B 15/02* (2006.01)

(52) U.S. Cl.
  CPC ......... *G05D 23/1902* (2013.01); *G05D 27/02* (2013.01); *F24F 2110/00* (2018.01); *F24F 2110/10* (2018.01); *F24F 2110/20* (2018.01)

(58) Field of Classification Search
  USPC ........................................ 62/176.6; 236/44 C
  See application file for complete search history.

(56) References Cited

U.S. PATENT DOCUMENTS

| | | | |
|---|---|---|---|
| 4,319,711 A | 3/1982 | Barker et al. | |
| 4,386,649 A | 6/1983 | Hines et al. | |
| 4,744,223 A * | 5/1988 | Umezu | F24F 11/0009 236/44 C |
| 4,897,798 A | 1/1990 | Cler | |
| 4,932,218 A * | 6/1990 | Robbins | F24F 5/0035 236/44 B |
| 5,000,381 A * | 3/1991 | Mueller | F24F 7/013 165/291 |
| 5,062,276 A | 11/1991 | Dudley | |
| 5,082,173 A | 1/1992 | Poehlman et al. | |
| 5,129,234 A | 7/1992 | Alford | |
| 5,261,481 A | 11/1993 | Baldwin et al. | |
| 5,351,855 A | 10/1994 | Nelson et al. | |
| 5,395,042 A | 3/1995 | Riley et al. | |
| 5,427,175 A | 6/1995 | Nagasawa | |
| 5,544,809 A * | 8/1996 | Keating | F24F 11/0009 236/44 C |
| 5,799,614 A | 9/1998 | Greenwood | |
| 5,822,997 A | 10/1998 | Atterbury | |
| 5,915,473 A | 6/1999 | Ganesh et al. | |
| 5,996,898 A * | 12/1999 | Parker | F04D 25/088 236/51 |
| 6,070,110 A | 5/2000 | Shah et al. | |
| 6,186,407 B1 | 2/2001 | Hammer et al. | |
| 6,427,454 B1 | 8/2002 | West | |
| 6,843,068 B1 | 1/2005 | Wacker et al. | |
| 6,892,547 B2 | 5/2005 | Strand | |
| 6,996,999 B2 * | 2/2006 | Wacker | G05D 22/02 165/225 |
| 7,130,719 B2 | 10/2006 | Ehlers et al. | |
| 7,155,921 B2 * | 1/2007 | Lee | F24F 5/001 236/44 A |
| 7,740,184 B2 | 6/2010 | Schnell et al. | |
| 7,793,510 B2 | 9/2010 | Perry et al. | |
| 8,863,536 B1 | 10/2014 | Perry et al. | |
| 2003/0000692 A1 | 1/2003 | Okano et al. | |
| 2003/0055603 A1* | 3/2003 | Rossi | F24F 11/0086 702/185 |
| 2003/0221821 A1* | 12/2003 | Patel | F24F 11/001 165/247 |
| 2004/0133314 A1 | 7/2004 | Ehlers et al. | |
| 2005/0040247 A1* | 2/2005 | Pouchak | G05D 23/1905 236/44 C |
| 2006/0260334 A1* | 11/2006 | Carey | F24F 3/1405 62/176.6 |
| 2006/0283965 A1 | 12/2006 | Mueller et al. | |
| 2007/0095082 A1 | 5/2007 | Garrett et al. | |
| 2007/0261422 A1 | 11/2007 | Crawford | |
| 2008/0135635 A1 | 6/2008 | Deng et al. | |
| 2008/0217419 A1 | 9/2008 | Ehlers et al. | |

\* cited by examiner

TWO MODE THERMOSTAT WITH SET-BACK TEMPERATURE AND HUMIDITY SET-POINT FEATURE

CROSS-REFERENCE TO RELATED APPLICATIONS

This application is a divisional of U.S. patent application Ser. No. 12/870,355, entitled "Two Mode Thermostat with Set-Back Temperature and Humidity Set-Point Feature Field", filed Aug. 27, 2010, which is a divisional of U.S. patent application Ser. No. 11/796,923, filed Apr. 30, 2007, now U.S. Pat. No. 7,793,510, issued Sep. 14, 2010. The entire disclosures of the above applications are incorporated herein by reference.

FIELD

The present disclosure relates to thermostats, and in particular, to thermostats used for controlling humidity levels within a conditioned space.

BACKGROUND

Thermostats are used to control climate control systems to maintain the temperature in a space conditioned by the climate control system. The typical thermostat compares the sensed temperature of the space with a set point temperature and activates the climate control system to heat or cool the space to the desired set point temperature. Some climate control systems further control conditioning to the space to provide either humidification or dehumidification control. In such systems, the thermostat is capable of sensing a space temperature that is above the desired temperature set-point, and responsively controlling operation of the air conditioner to cool the space to the temperature set-point. The thermostat is also capable of sensing a humidity level that is above the desired humidity set-point, and responsively controlling operation of the air conditioner to dehumidify the space to the humidity set-point. Such a thermostat will operate the air conditioner to lower the humidity level in the space below the humidity set point, even when the sensed temperature is already below the temperature set point. This results in the space being cooled below the desired temperature set point until the desired humidity level is attained. However, this can cause unwanted energy consumption in situations where it is not desired to further lower the temperature of the space.

SUMMARY

The present disclosure relates to thermostats that control a climate control system to provide for cooling a space and also dehumidifying the space. In one aspect of the present disclosure, various embodiments of a thermostat for controlling the operation of at least an air conditioner for conditioning a space are disclosed. The various embodiments comprise at least a first sensor configured to communicate information indicative of the temperature within the space, and at least a second sensor configured to communicate information indicative of the humidity within the space. The thermostat further comprises a controller in communication with the at least first and second sensors, for controlling the thermostat's operation. The controller is configured to operate in a first mode in which the controller operates the air conditioner when the sensed temperature of the space is above a temperature set-point or when the sensed humidity level is above the humidity set-point. The controller is further configured to operate in a second mode in which the controller only operates the air conditioner when the sensed temperature is above a set-back temperature set-point, or when the sensed humidity is above a set-back humidity set-point.

In another aspect of the present disclosure, a method for controlling the operation of the various thermostat embodiments is further provided. The method comprises sensing the temperature of the space to be maintained, sensing the humidity level of the space to be maintained, determining if the sensed humidity level is above the desired humidity set point, determining if the sensed temperature is above the temperature set point but less than a predetermined amount above the temperature set point, and responsively establishing operation of the compressor. The method calls for establishing operation of the compressor at full capacity and the blower at less than full capacity when the sensed humidity is above the desired humidity set point, and when the sensed temperature is above the temperature set point but less than a predetermined amount above the temperature set point.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
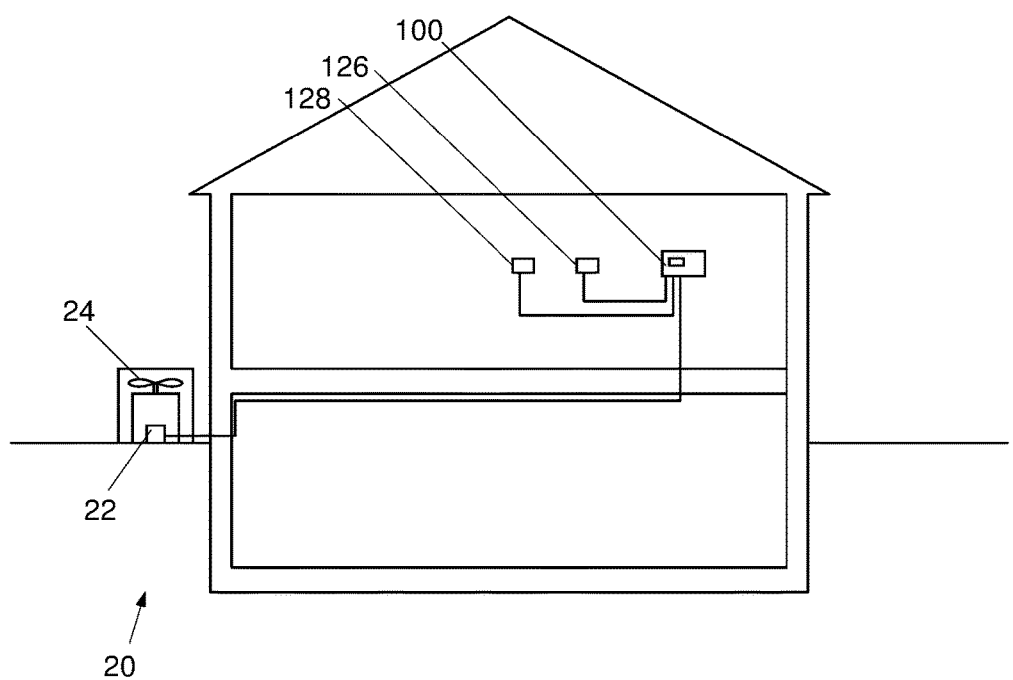
FIG. 1 is a side elevation view of a particular climate control system for a space having a thermostat according to the principles of the present disclosure.

The following description is merely exemplary in nature and is not intended to limit the present disclosure, application, or uses. It should be understood that throughout the drawings, corresponding reference numerals indicate like or corresponding parts and features.

According to various aspects of the present disclosure, there are provided various exemplary embodiments of a thermostat for maintaining a desired temperature and humidity setting for a space. In the various thermostat embodiments, a thermostat is provided that is programmable to include at least two temperature set-points corresponding to at least two different time periods during the day, at least one period of which is a set-back period during which the space is to be unoccupied and climate control operation is curtailed. The various embodiments comprise at least a first sensor configured to communicate information indicative of the temperature within the space, and at least a second sensor configured to communicate information indicative of the humidity level within the space. The thermostat further comprises a controller in communication with the at least first and second sensors, for controlling the thermostat's operation. The controller is configured to operate in a first mode in which the controller operates the air conditioner when the sensed temperature of the space is above a temperature set-point, or when the sensed humidity level is above the humidity set-point. The controller is further configured to operate in a second mode in which the controller only operates the air conditioner when the sensed temperature is above a set-back temperature set-point, or when the sensed humidity is above a set-back humidity set-point.

Figure 7:
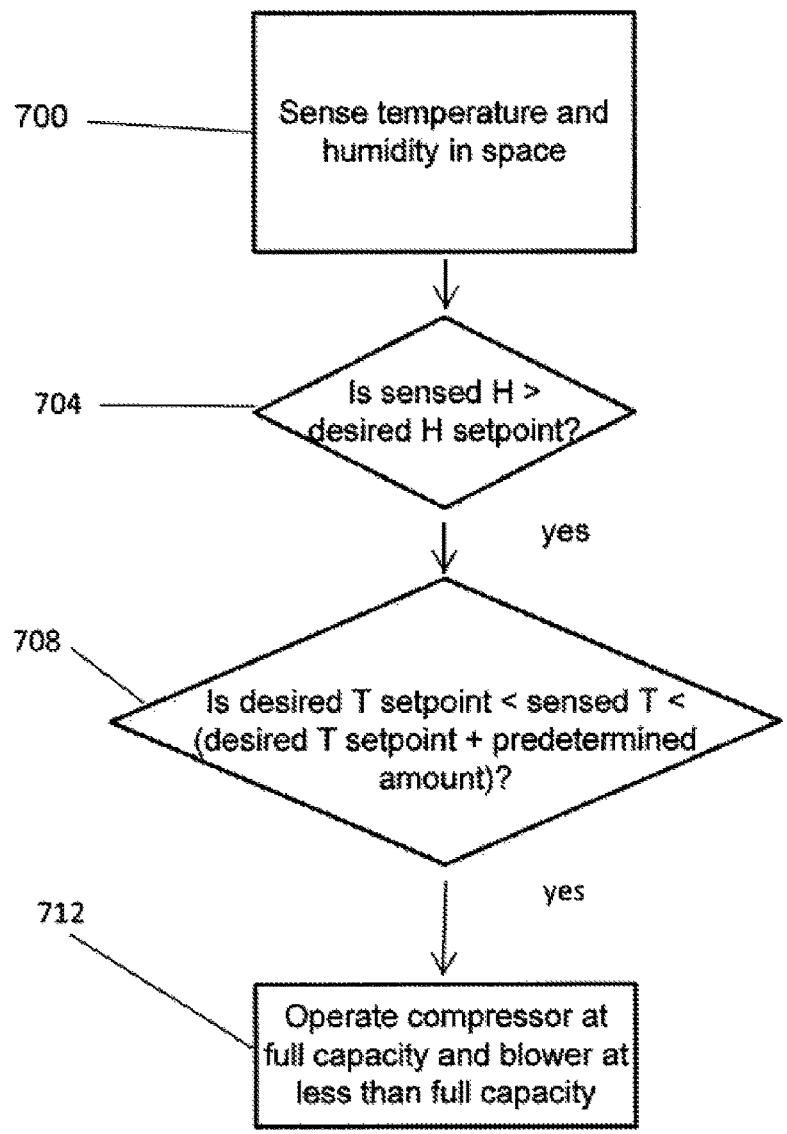
FIG. 7 is a flow-chart illustrating yet another embodiment of a thermostat and method for controlling a thermostat according to the principles of the present disclosure.

One example embodiment of a method for controlling the operation of a thermostat for an air conditioner is shown in FIG. 7. The air conditioner includes a variable speed compressor and blower, a humidity sensor and a temperature sensor. A step 700 includes sensing the temperature and humidity of a space to be maintained. A step 704 includes determining if the sensed humidity level is above the desired humidity set point. A step 708 includes determining if the sensed temperature is above the temperature set point but less than a predetermined amount above the temperature set point. If yes, then in step 712, operation of the compressor is established at full capacity and the blower at less than full capacity, i.e., when the sensed humidity is above the desired humidity set point and when the sensed temperature is above the temperature set point but less than a predetermined amount above the temperature set point. Additionally or alternatively, in some embodiments the controller may establish operation of the compressor at full capacity and operation of the blower at full capacity when the sensed temperature rises more than the predetermined amount above the desired temperature set point. In some embodiments the controller may responsively establish operation of the compressor at full capacity and operation of the blower at full capacity when the sensed humidity is below the desired humidity set point, and the sensed temperature is within a predetermined amount above the desired temperature set point.

In one first embodiment shown in FIG. 1, a programmable thermostat 100 is provided that is preferably in communication with various components of a climate control system 20. The climate control system 20 includes an air conditioning system having a compressor unit 22 and a blower unit 24, which may be operable in at least two speeds. The thermostat 100 controls the operation of the air conditioning system via connections to a compressor motor and a blower motor (not shown). The thermostat 100 is programmable to include at least two temperature set-points corresponding to at least two different time periods during the day, at least one period of which is a set-back period during which the space is to be unoccupied and climate control operation is curtailed. In an example of such a set-back period, the thermostat may switch from a desired 72 degree set point temperature to a set-back temperature set-point of 80 degrees when the space is un-occupied, to thereby reduce air conditioning operation during the set-back time period. The thermostat 100 further comprises an internal or external temperature sensor 126, and an internal or external humidity sensor 128, which sensors allow for determination of the temperature and humidity within the space.

In the first embodiment of a thermostat, the thermostat includes at least one temperature responsive device 126 that at least periodically outputs a variable or value that is indicative of the temperature in the space. The sensor may be any of a number of sensor types, and may comprise a crystal, oscillator or other electronic component having a frequency that responsively changes with temperature. Alternatively, the sensor may comprise a thermistor having a resistance value that changes in response to changes in temperature. The sensor could also be a device capable of communicating a voltage value that correlates to, or is indicative of, the temperature sensed in the space. The sensor may include circuitry to permit the sensor to communicate an absolute value of the temperature to a tenth of degree Fahrenheit. Likewise, the sensor may also include circuitry to enable communication of temperature information on a periodic basis, or upon request, such as when prompted by a microprocessor of the thermostat. Accordingly, the at least one sensor in the various embodiments is configured to sense and communicate information that is indicative of the temperature in the space.

In the first embodiment of a thermostat, the thermostat 100 further includes at least a second sensor or humidity responsive device 128 that at least periodically outputs a variable or value that is indicative of the humidity level in the space. The second sensor may be any of a number of sensor types, and may comprise a crystal, oscillator or other electronic component having a frequency that responsively changes with humidity. Alternatively, the second sensor may comprise a thermistor having a resistance value that changes in response to changes in humidity level. The second sensor could also be a device capable of communicating a voltage value that correlates to, or is indicative of, the sensed humidity level in the space. The second sensor may include circuitry to permit the sensor to communicate an absolute value of the humidity level. Likewise, the second sensor may also include circuitry to enable communication of sensed humidity level information on a periodic basis, or upon request, such as when prompted by a microprocessor of the thermostat 100. Accordingly, the at least one second sensor in the various embodiments is configured to sense and communicate information that is indicative of the humidity level in the space.

In the first embodiment, the thermostat 100 comprises a controller or microprocessor (not shown) for receiving communication signals from the at least one temperature sensor and at least one humidity sensor. The thermostat 100 is also configured to enable an occupant to provide input to the processor of a desired temperature set point and a desired humidity set point. The controller or microprocessor in the first embodiment is preferably a SCC825A microcontroller manufactured by Samsung, which includes a software program for controlling the operation of the thermostat 100 in at least a first mode of operation and a second set-back mode of operation.

Figure 2:
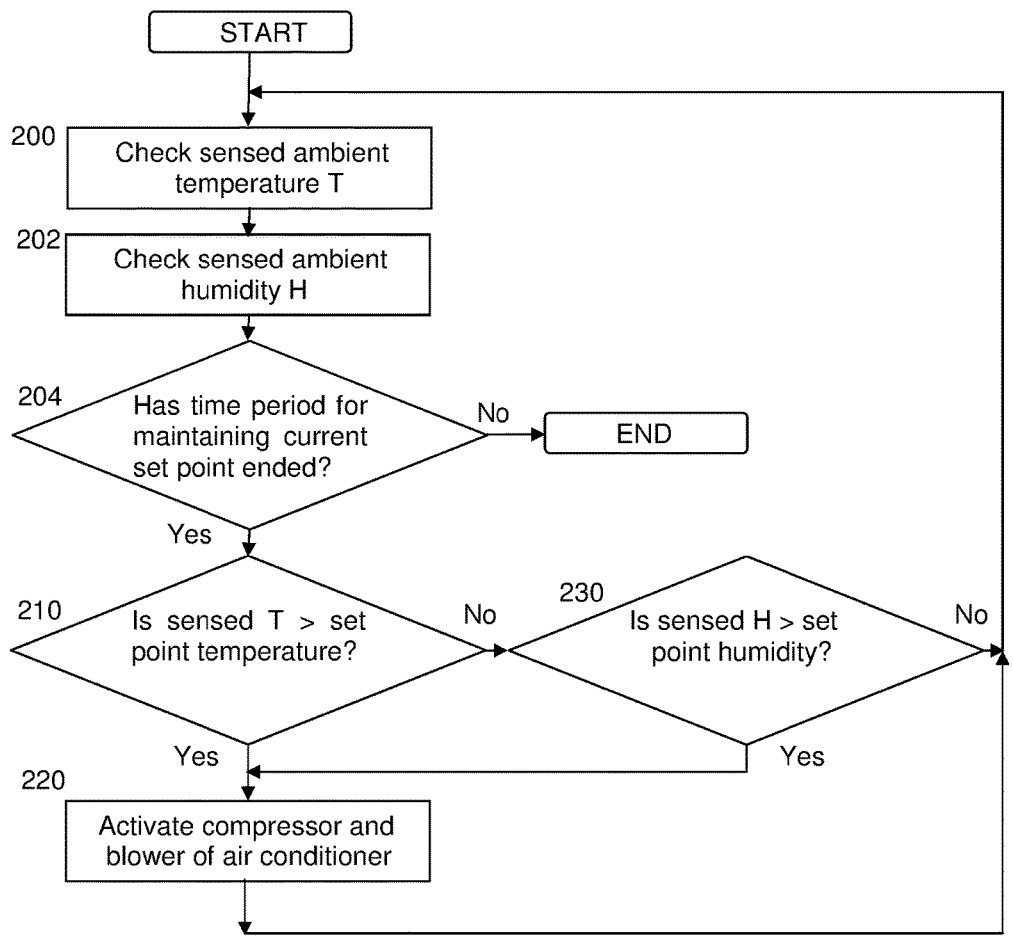
FIG. 2 is a flow-chart illustrating one embodiment of a thermostat and method for controlling a thermostat according to the principles of the present disclosure.

In the first embodiment's first mode of operation, the controller initiates signals for controlling the activation of the air conditioner system in response to a communication or signal from the at least one temperature sensor indicating that the space temperature is above a programmed temperature set point for a programmed time period in which the space is to be occupied (a non-set-back time period). Specifically, the program in the microprocessor operates according to the flow chart shown in FIG. 2. At step 200 and 202 the microprocessor receives communication indicating the value of the sensed temperature T and the sensed humidity level H, which are then stored. The microprocessor also monitors whether the end of the time period in which the set point temperature is to be maintained at step 204. At step 210, the microprocessor then compares the sensed temperature to the programmed temperature set point (72° F., for example), and compares the sensed humidity to the desired humidity set point (50%, for example). If the sensed temperature is greater than the set point temperature, but the sensed humidity level is below the humidity set point, the processor initiates signals at step 220 for activating relays to operate the air conditioner as needed until the sensed temperature is lowered to approximately the temperature set-point value. This operates the air conditioner to primarily cool the space. If the sensed temperature is greater than the set point temperature, regardless of whether the sensed humidity level is above the humidity set point, the microprocessor initiates signals at step 220 for activating relays to operate the air conditioner as needed until both the sensed temperature is lowered to the temperature set-point value, and the sensed humidity level is lowered to the humidity set-point value. It should be noted that at step 220, the thermostat may operate the blower unit at a reduced speed, such that the circulating air has more time for heat transfer to thereby remove more moisture from the air. This operates the air conditioner to both cool and dehumidify the space. If the sensed temperature is below the set point temperature, but the sensed humidity level is above the humidity set point at step 230, the microprocessor initiates signals at step 220 for activating relays to operate the air conditioner as needed until the sensed humidity level is lowered to the humidity set-point value. It should be noted that in step 220, the thermostat may operate the blower unit at a reduced speed, such that the circulating air has more time for heat transfer to thereby remove more moisture from the air. This operates the air conditioner to primarily dehumidify the space, and may result in cooling the space to a temperature below the temperature set-point.

Figure 3:
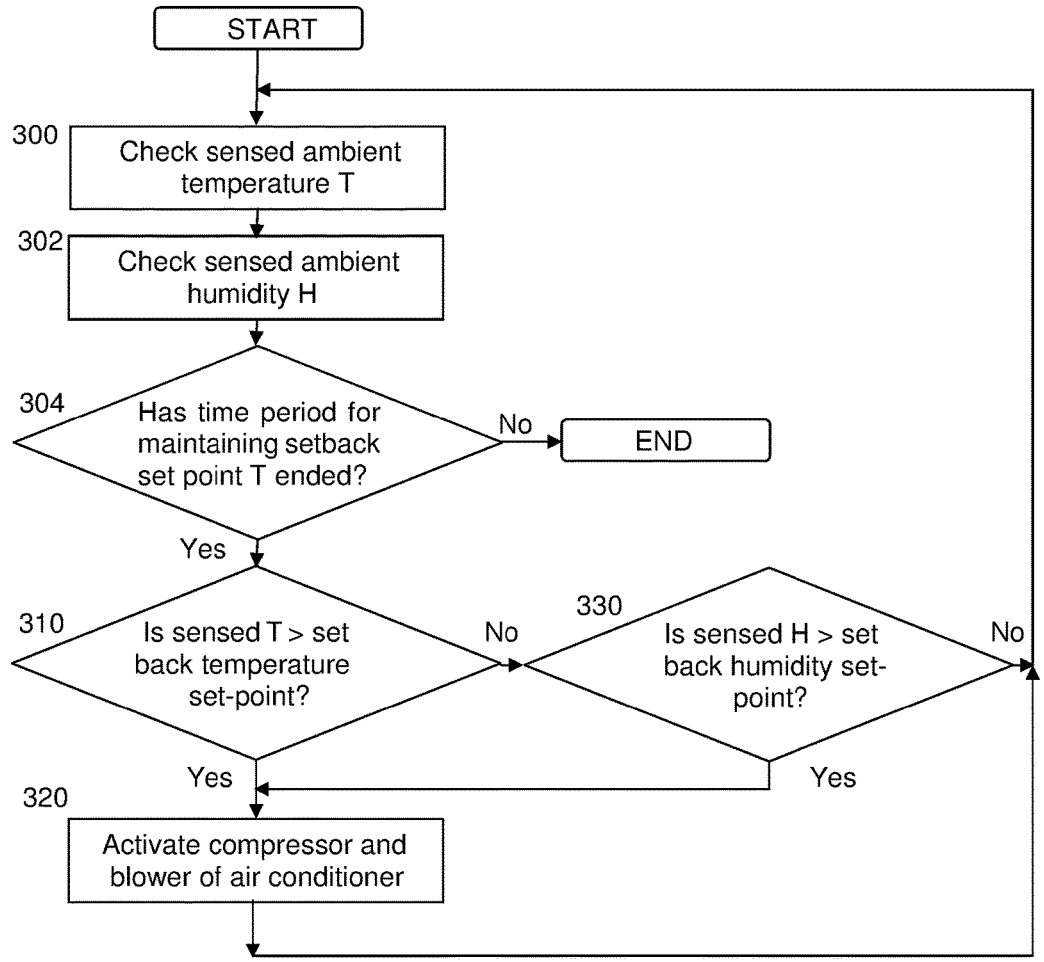
FIG. 3 is a flow-chart illustrating a second embodiment of a thermostat and method for controlling a thermostat according to the principles of the present disclosure.

In the first embodiment's second mode of operation, the controller initiates signals for controlling the activation of the air conditioner system in response to a communication or signal from the at least one temperature sensor, indicating that the space temperature is above a programmed set-back temperature set point for a programmed time period in which the space is to be unoccupied (a set-back time period). Specifically, the program in the microprocessor operates according to the flow chart shown in FIG. 3. At step 300 and 302 the microprocessor receives communication indicating the value of the sensed temperature T and the sensed humidity level H, which are then stored. At step 310, the microprocessor then compares the sensed temperature to the programmed set-back temperature set point (80° F., for example), and compares the sensed humidity to the programmed set-back humidity set point (65%, for example). If the sensed temperature is greater than the programmed set-back temperature set point, but the sensed humidity level is below the programmed set-back humidity set point, the processor initiates signals at step 320 for activating relays to operate the air conditioner as needed until the sensed temperature is lowered to approximately the set-back temperature set-point. This reduces the extent of air conditioner operation in maintaining an elevated "set-back" temperature setting, which reduces energy consumption relative to the standard temperature set-point value. It should be noted that the set-back humidity set-point is essential to attaining this reduced operation, since the sensed humidity level could easily rise above the desired "standard" humidity set-point and trigger a demand for air conditioning operation.

If the sensed temperature is greater than the programmed set-back temperature set point, regardless of whether the sensed humidity level is above the programmed set-back humidity set point, the microprocessor initiates signals at step 320 for activating relays to operate the air conditioner as needed until both the sensed temperature is lowered to the set-back temperature set-point, and the sensed humidity level is lowered to the programmed set-back humidity set-point. It should be noted that in step 320, the thermostat preferably operates the blower unit at its maximum speed or capacity, such that the space is cooled at a greater rate to thereby shorten the time it takes the air conditioner to reach the set-back temperature setting. This operates the air conditioner at a reduced level to lower the temperature and humidity towards the "set-back" temperature and "set-back" humidity settings, which also reduces energy consumption over the standard programmed temperature and humidity set-point values.

If the sensed temperature is below the programmed set-back temperature set point, but the sensed humidity level is above the programmed set-back humidity set point at step 330, the microprocessor initiates signals at step 320 for activating relays to operate the air conditioner as needed until the sensed humidity level is lowered to the programmed set-back humidity set-point value. This operates the air conditioner at a reduced level to dehumidify the space to an elevated "set-back" humidity setting, which reduces energy consumption over the standard humidity set-point value. Alternatively, the thermostat may be configured to ignore the sensed humidity level during a set-back period, such that the air conditioner is operated only for the purpose of maintaining the set-back temperature set-point at step 320. In either configuration, the thermostat is configured to avoid operation of the air conditioner in maintaining the desired humidity set-point during a set-back period, such that a reduction in operation is achieved from a higher set-back temperature set-point (without the sensed humidity triggering unnecessary air conditioning operation).

Figure 4:
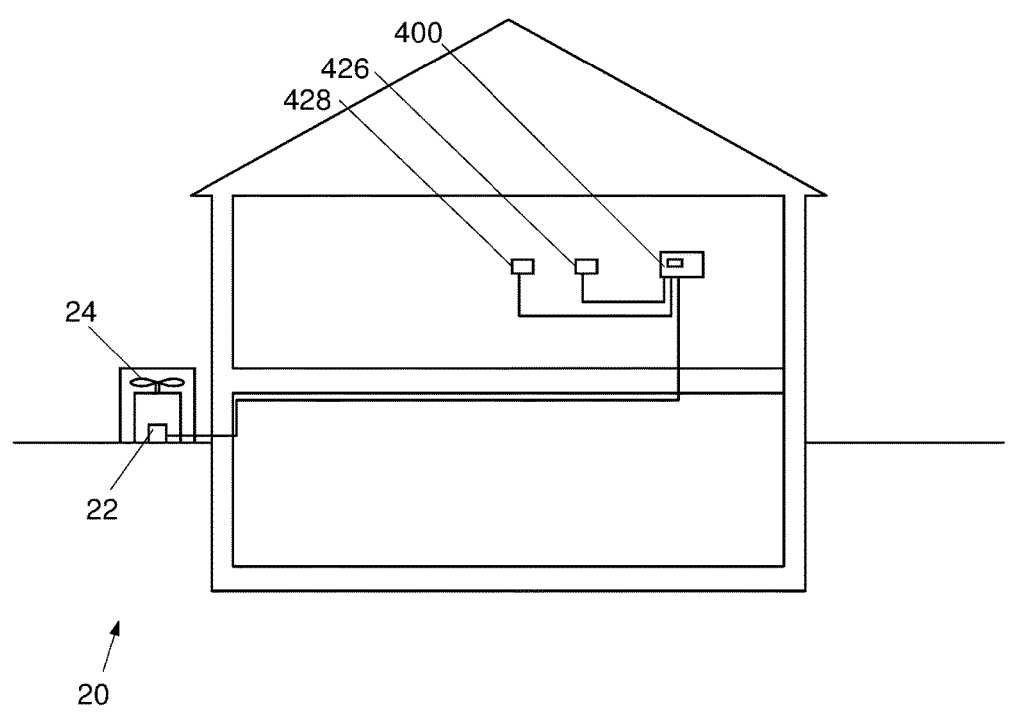
FIG. 4 is a side elevation view of a multi-stage climate control system for a space having a thermostat according to the principles of the present disclosure.

In a second embodiment shown in FIG. 4, a programmable thermostat 400 is provided that is preferably in communication with various components of a climate control system 20. The climate control system 20 includes an air conditioning system having a compressor unit 22 and a blower unit 24, each of which is capable of operating at both a full capacity level and a less than full capacity level. The thermostat 400 controls the operation of the air conditioning system via connections to a compressor motor and a blower motor. The thermostat 400 is programmable to include at least two temperature set-points corresponding to at least two different time periods during the day, at least one period of which is a set-back period during which the space is to be unoccupied and climate control operation is curtailed. In an example of such a set-back period, the thermostat may switch from a desired 72 degree set point temperature to a set-back temperature set-point of 80 degrees when the space is un-occupied, to thereby reduce air conditioning operation during the set-back time period. The thermostat 400 further comprises an internal or external temperature sensor 426, and an internal or external humidity sensor 428, which sensors allow for determination of the temperature and humidity within the space.

In the second embodiment of a thermostat, the thermostat 400 includes at least one temperature responsive device 426 that at least periodically outputs a variable or value that is indicative of the temperature in the space. The sensor may be any of a number of sensor types, and may comprise a crystal, oscillator or other electronic component having a frequency that responsively changes with temperature. Alternatively, the sensor may comprise a thermistor having a resistance value that changes in response to changes in temperature. The sensor could also be a device capable of communicating a voltage value that correlates to, or is indicative of, the temperature sensed in the space. The sensor may include circuitry to permit the sensor to communicate an absolute value of the temperature to a tenth of degree Fahrenheit. Likewise, the sensor may also include circuitry to enable communication of temperature information on a periodic basis, or upon request, such as when prompted by a microprocessor of the thermostat. Accordingly, the at least one sensor in the various embodiments is configured to sense and communicate information that is indicative of the temperature in the space.

In the second embodiment of a thermostat, the thermostat 400 further includes at least a second sensor or humidity responsive device 428 that at least periodically outputs a variable or value that is indicative of the humidity level in the space. The second sensor may be any of a number of sensor types, and may comprise a crystal, oscillator or other electronic component having a frequency that responsively changes with humidity. Alternatively, the second sensor may comprise a thermistor having a resistance value that changes in response to changes in humidity level. The second sensor could also be a device capable of communicating a voltage value that correlates to, or is indicative of, the sensed humidity level in the space. The second sensor may include circuitry to permit the sensor to communicate an absolute value of the humidity level. Likewise, the second sensor may also include circuitry to enable communication of sensed humidity level information on a periodic basis, or upon request, such as when prompted by a microprocessor of the thermostat. Accordingly, the at least one second sensor in the various embodiments is configured to sense and communicate information that is indicative of the humidity level in the space.

In the second embodiment, the thermostat 400 comprises a controller or microprocessor for receiving communication signals from the at least one temperature sensor and at least one humidity sensor. The thermostat 400 is also configured to enable an occupant to provide input to the processor of a desired temperature set point and a desired humidity set point. The controller or microprocessor in the first embodiment may be a SCC825A microcontroller manufactured by Samsung, for example, which is included with a software program for controlling the operation of the thermostat 400 in at least a first mode of operation and a second set-back mode of operation.

Figure 5:
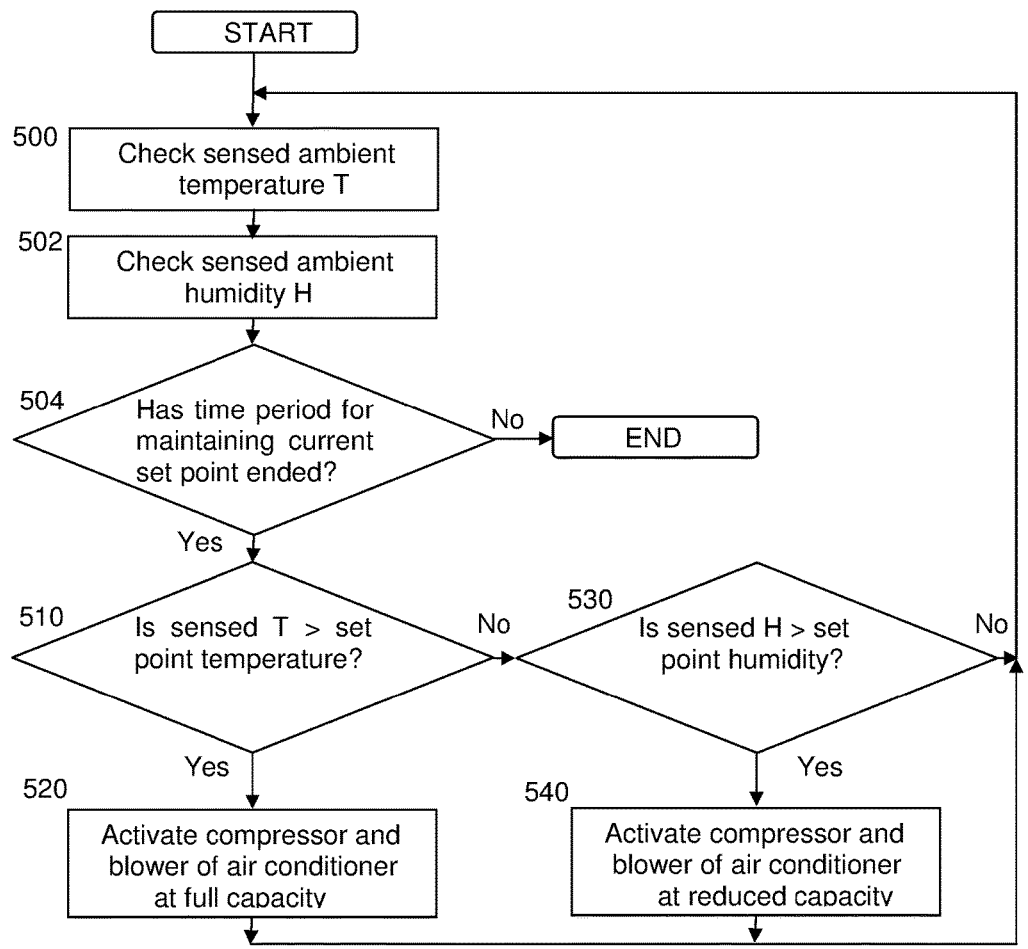
FIG. 5 is a flow-chart illustrating another embodiment of a thermostat and method for controlling a thermostat according to the principles of the present disclosure.

In the second embodiment's first mode of operation, the controller initiates signals for controlling the activation of the air conditioning system in response to a communication from the at least one temperature sensor indicating that the space temperature is above a programmed temperature set point for a time period in which the space is to be occupied (a non-set-back time period. Specifically, the program in the microprocessor operates according to the flow chart shown in FIG. 5. At step 500 and 502, the microprocessor receives communication indicating the value of the sensed temperature T and the sensed humidity level H, which are then stored. At step 510, the microprocessor then compares the sensed temperature to the programmed temperature set point (72° F., for example), and compares the sensed humidity to the desired humidity set point (50%, for example). If the sensed temperature is greater than the set point temperature, but the sensed humidity level is below the humidity set point, the processor initiates signals at step 520 for activating relays to operate the compressor and blower at full capacity until the sensed temperature is lowered to approximately the temperature set-point value. This operates the air conditioner in a maximum cooling capacity to quickly cool the space. It should be noted that the microprocessor/program may be configured, where the sensed temperature is greater than the set point temperature and the sensed humidity level is above the humidity set point, to activate relays at step 520 or 540 to operate the compressor and blower as needed to lower the temperature and the humidity towards the temperature set-point value and the humidity set-point value. It should be noted that in step 540, the thermostat may operate the blower unit at a reduced speed, such that the circulating air has more time for heat transfer to thereby remove more moisture from the air. If the sensed temperature is below the set point temperature, but the sensed humidity level is above the humidity set point at step 530, the microprocessor initiates signals at step 540 for activating relays to operate both the compressor and blower at less than full capacity until the sensed humidity level is lowered to the humidity set-point value. It should be noted that operating the compressor and the blower unit at a reduced speed gives circulating air more time for heat transfer to thereby remove more moisture from the air, while minimizing the overall cooling rate to the space. This operates the air conditioner to primarily dehumidify the space, and may result in cooling the space to a temperature below the temperature set-point.

Figure 6:
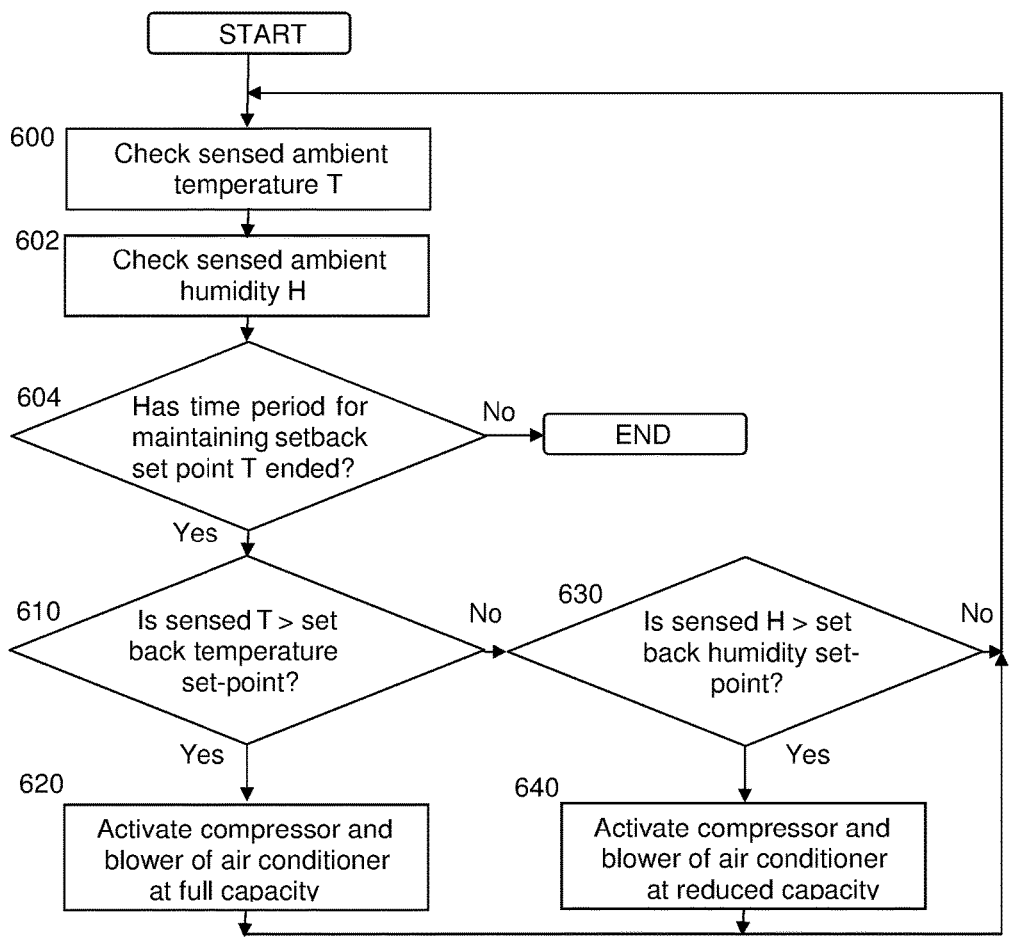
FIG. 6 is a flow-chart illustrating yet another embodiment of a thermostat and method for controlling a thermostat according to the principles of the present disclosure.

In the second embodiment's second mode of operation, the controller initiates signals for controlling the activation of the compressor and blower of the air conditioning system in response to a communication from the at least one temperature sensor, indicating that the space temperature is above a programmed set-back temperature set point for a time period in which the space is to be unoccupied (a set-back time period). Specifically, the program in the microprocessor operates according to the flow chart shown in FIG. 6. At step 600 the microprocessor receives communication indicating the value of the sensed temperature T and the sensed humidity level H, which are then stored. At step 610, the microprocessor then compares the sensed temperature to the programmed set-back temperature set point (80° F., for example), and compares the sensed humidity to the programmed set-back humidity set point (65%, for example). If the sensed temperature is greater than the programmed set-back temperature set point, but the sensed humidity level is below the programmed set-back humidity set point, the processor initiates signals at step 620 for activating relays to operate the compressor and blower unit at full capacity until the sensed temperature is lowered to approximately the set-back temperature set-point. This maximum cooling capacity operation reduces the extent of air conditioner run time in maintaining an elevated "set-back" temperature setting, which reduces energy consumption relative to the standard temperature set-point value. It should be noted that the set-back humidity set-point is essential to attaining this reduced operation, since the sensed humidity level could easily rise above the desired "standard" humidity set-point and trigger a demand for air conditioning operation.

If the sensed temperature is greater than the programmed set-back temperature set point, regardless of whether the sensed humidity level is above the programmed set-back humidity set point, the microprocessor initiates signals at step 620 for activating relays to operate the compressor and blower unit as needed until both the sensed temperature is lowered to the set-back temperature set-point, and the sensed humidity level is lowered to the programmed set-back humidity set-point. It should be noted that the thermostat could also be configured to operate the air conditioner as in step 620, where the thermostat may operate the compressor and the blower unit at its maximum speed or capacity, such that the space is cooled at a greater rate to thereby shorten the time it takes the air conditioner to reach the set-back temperature setting. This operates the air conditioner in a manner that reduces run time in maintaining elevated "set-back" temperature and "set-back" humidity settings, which thereby reduces energy consumption over the standard programmed temperature and humidity set-point values.

If the sensed temperature is below the programmed set-back temperature set point, but the sensed humidity level is above the programmed set-back humidity set point at step 630, the microprocessor initiates signals at step 640 for activating relays to operate the air conditioner as needed until the sensed humidity level is lowered to the programmed set-back humidity set-point value. This operates the air conditioner at a reduced level to dehumidify the space to an elevated "set-back" humidity setting, which reduces energy consumption over the standard humidity set-point value. Alternatively, the thermostat may be configured to ignore the sensed humidity level during a set-back period, such that the air conditioner is operated as in step 620 only for the purpose of maintaining the set-back temperature set-point. This configuration may be simply attained by setting the set-back humidity set-point to 100%, for example, such that the sensed humidity will never be above the set-back humidity set point. In either configuration, the thermostat is configured to avoid operation of the air conditioner in maintaining the desired humidity set-point during a set-back period, such that a reduction in operation is achieved from a higher set-back temperature set-point (without the sensed humidity triggering unnecessary air conditioning operation).

Thus, the various thermostat embodiments can automatically switch between a first mode of operation and a second set-back mode of operation, to prioritize reduction in air conditioning operation over maintaining humidity control to provide optimum energy savings to the occupant. The advantages of the above described embodiments and improvements should be readily apparent to one skilled in the art, as to enabling a thermostat with humidity control. Additional design considerations may be incorporated without departing from the spirit and scope of the invention. The description in this disclosure is merely exemplary in nature and, thus, variations are not to be regarded as a departure from the spirit and scope of the disclosure. More particularly, the apparatus may be adapted to any apparatus for cooling a space. Accordingly, it is not intended that the invention be limited by the particular embodiments or forms described above, but by the appended claims.

What is claimed is:

1. A method for controlling operation of a thermostat for an air conditioner having a variable speed compressor and a blower, a humidity sensor and a temperature sensor, the method performed by a controller using input from the sensors to control humidity and temperature of a space, the method comprising the steps of:

based on a current time period, the controller using one of a plurality of programmed temperature set points as a desired temperature set point and using one of a plurality of programmed humidity set points as a desired humidity set point;

the controller receiving a sensed temperature of the space;
   the controller receiving a sensed humidity of the space;
   the controller comparing the sensed humidity with the desired humidity set point;
   the controller comparing the sensed temperature with the desired temperature set point; and
   based on the current time period, the controller establishing:
   (a) a first mode of operation for a non-set-back time period in which the compressor operates at full capacity and the blower operates at less than full capacity when the sensed humidity is above the desired humidity set point and the sensed temperature is within a predetermined amount above the desired temperature set point, or in which the compressor operates at less than full capacity and the blower operates at less than full capacity when the sensed humidity is above the desired humidity set point and the sensed temperature is below the desired temperature set point; and
   (b) a set-back mode of operation for a set-back time period, in which the air conditioner operates only when the sensed temperature is above a desired set-back temperature set point regardless of whether the sensed humidity is above a desired set-back humidity set point whereby the controller ignores the sensed humidity and the desired set-back humidity set point when the sensed temperature is above the desired set-back temperature set point.

2. The method of claim 1, further comprising the step of establishing by the controller, in the first mode, operation of the compressor at full capacity and operation of the blower at full capacity when the sensed temperature rises more than the predetermined amount above the desired temperature set point.

3. The method of claim 1, wherein the set-back mode of operation comprises operating the air conditioner at a reduced level when the sensed humidity is below the desired set-back humidity set point and above a programmed humidity set point programmed for use in the first mode as the desired humidity set point and the sensed temperature is above the desired set-back temperature set point.

4. The method of claim 3, wherein the desired set-back humidity set point for the set-back mode exceeds the programmed humidity set point programmed for use as the desired humidity set point in the first mode by at least a value of 15 percent relative humidity.

5. The method of claim 3, wherein the desired set-back temperature set point for controlling operation of the air conditioner in the set-back mode of operation is at least 5 degrees higher than the programmed temperature set point programmed for use as the desired temperature set point in the first mode of operation.

6. The method of claim 3, further comprising the step of establishing by the controller, in the set-back mode, operation of the compressor at full capacity and operation of the blower at full capacity when the sensed temperature rises more than a predetermined amount above the desired set-back temperature set point.

7. The method of claim 1, further comprising the step of switching by the controller from the first mode of operation to the set-back mode of operation based on programmed time period settings selected by a user of the thermostat.

8. The method of claim 1, further comprising the step of establishing by the controller in the set-back mode of operation, air conditioner operation with the blower and the compressor at a reduced capacity when the sensed humidity is above the desired set-back humidity set point and the sensed temperature is below the desired set-back temperature set point.

\* \* \* \* \*